Oct. 16, 1951 G. E. HENNING 2,571,715
STRIP MATERIAL
Filed Sept. 7, 1949
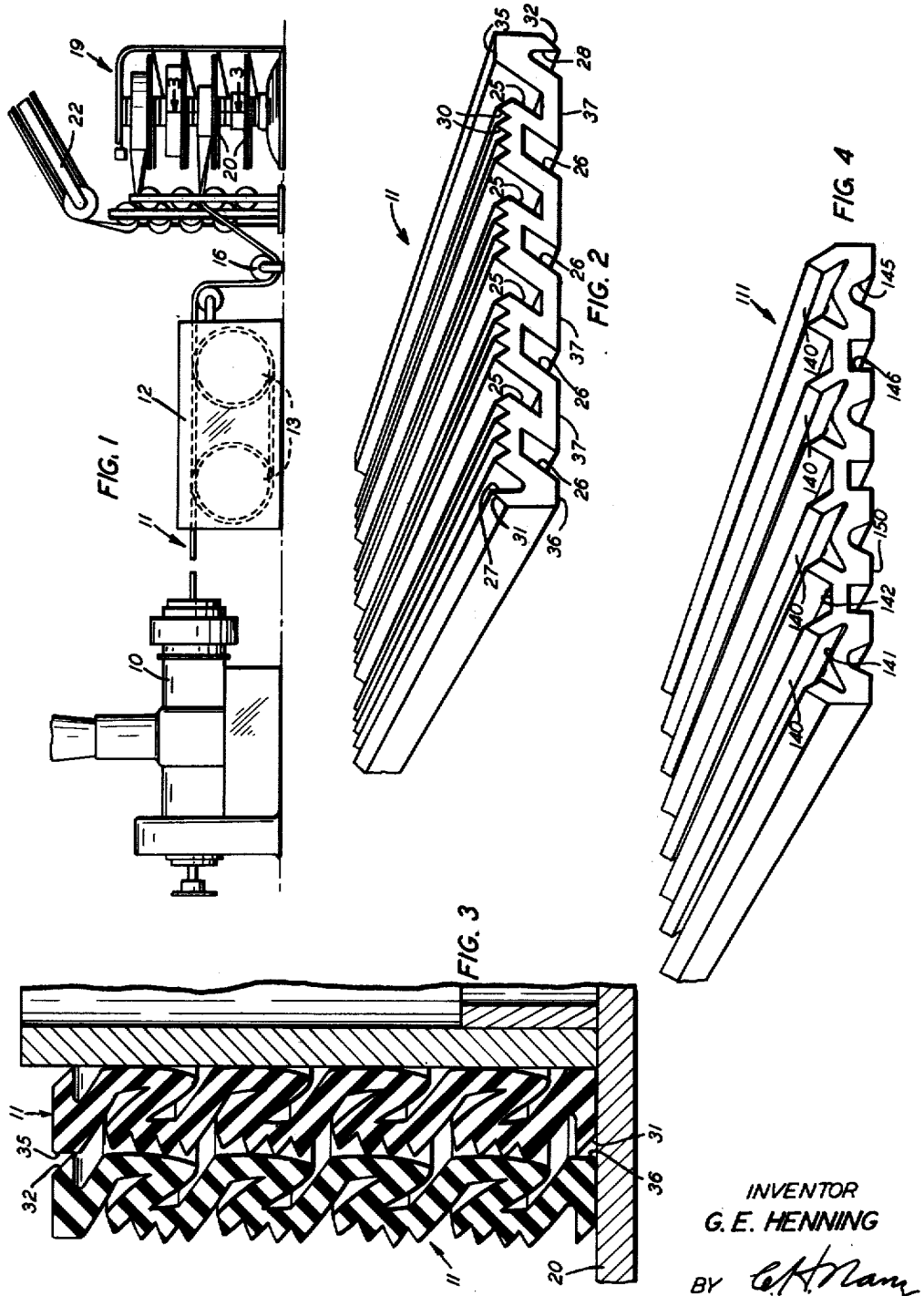
INVENTOR
G. E. HENNING
BY [signature]
ATTORNEY Patented Oct. 16, 1951

2,571,715

UNITED STATES PATENT OFFICE 2,571,715

STRIP MATERIAL

George E. Henning, Baltimore, Md., assignor to Western Electric Company, Incorporated, New York, N. Y., a corporation of New York Application September 7, 1949, Serial No. 114,333

8 Claims. (Cl. 154—55)

This invention relates to strip material, and more particularly to strip material having a form which prevents convolutions of the strip material from sticking together when it is coiled on reels.

In accordance with one method employed in the manufacture of electrical conductors, a previously mixed, extrudable compound is formed while hot into a continuous strip of rectangular cross-section. The hot strip is passed through a cooling device, and subsequently is fed into an extruding apparatus, which extrudes the compound in the form of an insulating covering or protective jacket around an advancing core. In such a method of handling the insulating material, the compound mixing and strip-forming apparatus usually are capable of producing a sufficient quantity of strip to supply a plurality of extruding machines. Under these conditions, lengths of the compound strip are coiled up on intermediate storage and takeup reels at a point between the strip-forming means and the extruding machines in order to maintain an adequate supply of compound strip for each extruding machine.

Certain types of insulating compound, even after passing through the cooling device, remains in a slightly tacky state, and, as a result, the adjacent layers of the compound strip tend to stick together when the strip is wound on the storage reels. This sticking of the strip prevents the strip from being withdrawn readily from the reels as it is required by the extruding machines.

An object of the invention is to provide strip material having new and improved form.

Another object of the invention is to provide strip material having a form which prevents convolutions of the strip material from sticking together when it is coiled on storage reels or the like.

Strip material embodying certain features of the invention has a form characterized by a plurality of longitudinal grooves extending along one surface of the strip, said grooves being of such depth and proportions that the strip is collapsible transversely.

A clear understanding of the invention will be had from the following detailed description of a specific embodiment thereof, when read in conjunction with the appended drawings, in which:

Fig. 1 is a schematic elevation of apparatus for forming, cooling and storing compound strip material used for insulating or jacketing electrical conductors;

Fig. 2 is an isometric view of a piece of strip material having a form embodying certain features of the invention;

Fig. 3 is an enlarged, fragmentary vertical section taken along line 3—3 of Fig. 1 and showing the condition of the strip material when it is wound on the takeup reels shown in Fig. 1, and Fig. 4 is an isometric view of a piece of strip material having another form comprising an alternate embodiment of the invention.

Referring now to Fig. 1 of the drawings, there is shown schematically a strip-handling system, which may be used for handling a continuously formed strip material suitable for insulating or jacketing electrical conductors. The strip material may be formed from a neoprene compound, a rubber compound or a synthetic rubber-like compound, such as a Buna-S compound, which may be vulcanized, or the strip material made of any one of various thermoplastic materials, such as polyvinyl compounds or polyethylene, which may be extruded as an insulating covering or jacket on a continuously advancing filamentary core, such as one or more copper wires. A system of this type for handling insulating material in strip form is fully disclosed and described in a copending application Serial No. 103,434, filed July 7, 1949, by R. R. Barber, G. E. Henning, and B. A. Raetsch for "Methods of and Systems for Processing Vulcanizable Compounds." Consequently, only so much of the material handling system as is necessary to a complete understanding of the invention will be described here.

The numeral 10 designates an extruder designed to receive successive batches of mixed compounds from suitable mixing equipment (not shown), and to extrude them therefrom in the form of a continuous strip material indicated generally at 11. The strip material 11 passes directly and continuously into a cooler 12 in which the strip travels through a tortuous path around drums 13—13, and is subjected to a plurality of sprays of cold water to reduce the temperature of the strip. The strip 11 leaves the cooler and passes under a pulley 16, which directs the strip to an intermediate strip-takeup and storage apparatus 19 designed to take up lengths of the strip on a plurality of reels 20—20. A conveyor 22 is provided for withdrawing the strip material 11 from the reels 20—20 of the takeup apparatus and carrying it to conventional extruding apparatus (not shown) designed to work the compound strip into an extrudable state and to extrude the compound as an insulating covering or jacket on a filamentary core. This treatment of the compound produces a tough, pliable insulating covering or jacket on the conductor.

Since the strip material 11 has not been cured during the portion of the handling process shown in Fig. 1, and the strip is still warm, the adjacent convolutions of the strip coiled on the reels 20—20 tend to stick to each other. This condition is further aggravated by the pressure applied against each layer as it is taken up on the reels 20—20 of the takeup apparatus 19. This sticking between the adjacent layers of the strip wound on the reels makes it difficult to withdraw the strip from the reels so that it may be carried to the extruding apparatus by the conveyor 22. To prevent the adjacent turns of the compound strip on the reels from sticking together it is desirable to provide a minimum contact area between the adjacent turns. It also is desirable to provide one surface of the strip with portions which are collapsible transversely of the strip so that the pressure applied to the strip as it is coiled up will cause those portions to yield and thereby reduce the tendency of the surface of the strip to cut into and become imbedded in the adjacent surfaces of the several convolutions on the reel.

A strip of material having these characteristics is shown in Fig. 2, and, as shown, the strip is extruded from the extruder 10 so as to have a cross-sectional form characterized by a plurality of grooves 25—25 extending longitudinally along the upper surface of the strip. The grooves 25—25 are parallel to each other and are positioned obliquely with respect to the transverse axes of the strip. A plurality of grooves 26—26 extend longitudinally along the lower surface of the strip 11 so that each groove 26 is parallel to and positioned between adjacent grooves 25—25 extending along the upper surface of the strip. The grooves 25—25 and 26—26 are of the same width and depth, the depth of the grooves being approximately two thirds of the total thickness of the strip 11.

A groove 27 extends longitudinally along the upper surface of the strip adjacent to the left-hand edge of the strip, when viewed in Fig. 2. A similar groove 28 extends longitudinally along the lower surface of the strip adjacent to the right-hand edge of the strip. The portions of the upper surface of the strip 11 included between the grooves 25—25, have a plurality of V-shaped grooves 30—30 extending longitudinally therealong. The upper surface of the strip between the groove 27 and the left-hand edge of the strip is bevelled at 31 to form a sharp edge near the side of the strip like the edges formed by the V-shaped grooves 30—30. Likewise, the lower surface of the strip between the groove 28 and the right-hand edge of the strip is bevelled at 32. The location of the groove 25 adjacent to the right-hand edge of the strip forms a narrow land 35, which extends longitudinally along the upper surface of the strip. A similar narrow land 36 extends along the left-hand side of the bottom surface of the strip, and substantially wider lands 37—37 extend along the lower surface of the strip between the grooves 26—26.

The cross-sectional form of the strip shown in Fig. 2 is designed to reduce the contact area between the adjacent surfaces of the strip when it is wound on the reels 20—20 of the takeup apparatus 19. The particular cross-sectional form obtained by the grooves 25—25 and 26—26 exposes a greater area of the strip to the sprays of cold water as the strip passes through the cooler 12, whereby the temperature of the strip is reduced to a value lower than that which is obtainable with a solid strip. Consequently, the strip 11, having the described cross-sectional form, reaches the reels 20—20 at a lower temperature and this fact aids in preventing the adjacent layers of the strips from sticking together on the reels.

Referring to Fig. 3 of the drawings, it is noted that, when the strip is wound in an edgewise manner on the reels 20—20, the pressure exerted on each layer causes the portions of the strip between the grooves 25—25 to move in the direction in which the grooves are obliquely positioned with respect to the transverse axes of the strip. The amount of the movement of these portions of the strip is controlled by the resiliency of the material from which the strip 11 is extruded, the angle at which the grooves 25—25 and 26—26 are positioned with respect to the transverse axes of the strip and the tension maintained on the strip as it is wound on the reels 20—20.

The angle at which the grooves are formed in the strip is selected so that the portions of the strip between the grooves 25—25 do not move too far in the direction which the grooves are positioned, that is, so that the opposite side of the grooves do not touch when the compound strip is wound on a reel. If the angle at which the grooves are positioned permits the opposite sides of the grooves to touch when the strip 11 is wound on a reel, the portions of the strip between the grooves are prevented from further movement, whereby the pressure on the surface of the layers of the strip increases and tends to cause the adjacent convolutions to stick together. Therefore, it is desirable to form the grooves at an angle which will maintain sufficient clearance between the sides of the grooves 25—25 and 26—26 when the strip is wound on a reel, as shown in Fig. 3.

This movement of the portions of the strip between the grooves 25—25 also causes the upper edge of each surface of the strip having the V-shaped grooves 30—30 (Fig. 3) extending longitudinally therealong, to curl inwardly toward the bottom of the grooves 25—25 and causes the lower side of each land 37 to curl outwardly toward the bottom of the grooves 26—26. This yielding of the portions of the strip prevents the surfaces formed by the V-shaped grooves from cutting into the lands 37—37 of the adjacent layer of the strip because a portion of the pressure applied on the inner layer of the strip is expended in bending these portions of the strip to their positions shown in Fig. 3. Since the lower edges of the grooves 25—25 curl inwardly and the upper edges of the lands 37—37 curl outwardly as the portions of the strip between the grooves 25—25 move upwardly, the V-shaped grooves 30—30 at each edge of the grooved surfaces do not engage the lands 37—37, which action further reduces the contact area between the grooves 30—30 and the lands 37—37 and thereby reduces the tendency of the adjacent layers to stick together.

The movement of the portions of the strip between the grooves 25—25 also causes the strip to collapse along the longer of its transverse axes, in which case, the width of the strip 11 after it is on the reels 20—20 is slightly less than that width of the strip as it leaves the extruder 10. Thus, the arrangement of the grooves 25—25 and 26—26 in the strip 11 materially reduces the contact area between the strip and at the same time, makes the strip collapsible along the transverse axes of the strip. The reduced contact area between the adjacent layers of the strip 11 and the ability of the strip 11 to collapse along its transverse axes prevents the compound strip from sticking together as it is coiled upon the reels 20—20.

It should be noted that when the strip is coiled on the reels 20—20, shown in Fig. 3, the land 36 abuts the sharp surface formed by the bevel 31 extending along the outer surface of the strip, and the sharp surface formed by the bevel 32 abuts the land 35. This arrangement of the upper and lower edges of the strip forms a knife-edge surface contact between the surface of the adjacent layer and thereby prevents the edges of the strip from sticking together.

A strip forming an alternate embodiment of the invention is shown in Fig. 4 of the drawing, and is indicated generally by the numeral 111. The strip 111 is extruded by means of a strip extruder like the extruder 10, to have a form characterized by a plurality of short, thick, upwardly projecting ribs 140—140 extending longitudinally along the strip. Preferably, there are an even number of ribs equally spaced across the upper surface of the strip so that the odd numbered ribs are inclined at an angle toward the right-hand edge of the strip when counting the ribs from left to right in Fig. 4. The even numbered ribs are inclined in an opposite direction at an angle toward the left-hand edge of the strip. This arrangement form a plurality of pairs in which the ribs of each pair are inclined toward each other. The free edges of the ribs 140—140 are beveled so as to form a plurality of equally spaced sharp surfaces extending longitudinally along the strip 111.

The surface of the strip included between the ribs of each pair of ribs 140—140 which are inclined toward each other, is formed convexly as indicated by the numerals 141—141. The surface of the strip between each pair of ribs which are inclined away from each other, is flat as indicated by the numeral 142. Semicircular grooves 145—145 extend along the lower surface of the strip directly beneath the convex surfaces 141—141, and rectangular grooves 146—146 extend longitudinally along the lower surface of the strip directly beneath the flat surfaces 142—142.

The grooves 145—145 and 146—146, together with the construction of the ribs 140—140, provide a strip which has a substantial area thereof exposed to the cold water sprays as such a strip passes through a cooling device like the cooler 12. The strip 111 is designed so that lands 150—150 extending longitudinally along the lower surface of the strip between the grooves 145—145 and 146—146, are positioned directly beneath the free end of the ribs 140—140 extending along the upper surface of the strip. This construction causes the lands to abut against the free ends of the ribs of the adjacent layer of the strip when the strip 111 is wound on a reel in the manner shown in Fig. 3. Since the ribs 140—140 are angularly positioned on the upper surface of the strip, they yield readily in the direction in which they are inclined when pressure is applied to the ribs by an adjacent layer of the strip as the strip is wound on reels like the reels 20—20.

As the strip is wound on the reel, the pressure between the layers builds up, in which case, the pressure between the layers causes the ribs to bend inwardly toward the concave surfaces 141—141 of the strip. This yielding of the ribs tends to absorb some of the pressure built up between the adjacent layers of the strip, thereby prevents the ribs from cutting into the lands 150—150 of the adjacent turn to an extent which would cause severe sticking of the adjacent layers of the strip. The cross-sectional form of the strip 111 provides a strip which reduces the contact area between the adjacent surfaces of the strip when it is wound on the reel and also provides the strip with collapsible portions which yield under the pressure built up between the adjacent layers of the strip and thereby prevents harmful sticking of the adjacent layers of the strip.

It is to be understood that strips having a cross-sectional form like the strips 11 and 111 may be extruded from compounds other than those normally used for insulating or jacketing conductors to prevent the strip from sticking together when it is coiled up on reels or similar storage and handling apparatus.

Strip material having the above-described cross-sectional form are simply illustrative of the principles of the invention. Strip material having numerous other cross-sectional forms may be readily devised by those skilled in the art which will embody the principles of the invention and fall within the spirit and scope thereof.

What is claimed is:

1. A strip structure which renders tacky surfaces of a strip of flexible, rubbery material nonadherent, characterized by a plurality of grooves extending longitudinally along the top surface of the strip, and a plurality of grooves extending longitudinally along the lower surface of the strip and disposed inbetween the first-mentioned groove, said grooves being of such depth and proportion that the strip is electrically collapsible transversely.

2. A strip structure which renders an elongated strip of flexible, rubbery material having a tacky surface nonadherent, characterized by a plurality of grooves extending longitudinally along the upper surface of the strip, a plurality of grooves extending along the lower surface of the strip inbetween the grooves in the upper surface of the strip, said grooves being of such depth and proportions that the portions of the strip between the grooves are elastically collapsible along the shorter of the transverse axes of the strip.

3. A strip structure which renders an elongated strip of flexible material having a tacky surface nonadherent, characterized by a plurality of grooves extending longitudinally along the upper surface of the strip, a plurality of grooves extending along the lower surface of the strip inbetween the grooves in the upper surface of the strip, said grooves being of such depth and proportions that the portions of the strip between the grooves are elastically collapsible along the shorter of the transverse axes of the strip, and a plurality of V-shaped grooves extending longitudinally along the upper surface of the portions of the strip included between the grooves.

4. A nonadherent surface for an elongated strip of flexible, tacky, rubbery material, characterized by a plurality of grooves extending longitudinally along the surface thereof, said grooves being obliquely positioned with respect to the transverse axes of the strip so that the portions of the strip between the grooves are collapsible.

5. A strip structure which renders an elongated strip of flexible material having a tacky surface nonadherent, characterized by a plurality of grooves extending longitudinally along the upper surface of the strip and positioned obliquely with respect to the transverse axes which is perpendicular to the upper surface of the strip, a plurality of grooves extending longitudinally along the lower surface of the strip and positioned obliquely with respect to the transverse axes of the strip, said grooves being of such depth and proportions that the strip is elastically collapsible along the said transverse axes of the strip, and a plurality of V-shaped grooves extending longitudinally along the upper surface of the portions of the strip disposed between the grooves.

6. A strip structure which renders an elongated strip of flexible material having a tacky surface nonadherent, characterized by a plurality of grooves extending longitudinally along the upper surface thereof and positioned obliquely with respect to the transverse axes of the strip, said grooves having a depth equal to three-quarters of the thickness of the strip along the longitudinal axes of the strip so that the portions of the strip between the grooves are elastically collapsible along said transverse axes.

7. A strip structure which renders an elongated strip of flexible material having a tacky surface nonadherent, characterized by a plurality of grooves extending longitudinally along the upper surface of the strip, said grooves having the opposite sides thereof inclined obliquely toward the longer transverse axis of the strip so as to leave a plurality of ribs projecting from the strip at an acute angle with respect to the longest transverse axis of the strip, said arrangement of the ribs causing them to be elastically collapsible along the shorter of the transverse axes of the strip.

8. A strip structure which renders an elongated strip of flexible material having a tacky surface nonadherent, characterized by a plurality of equally spaced grooves extending longitudinally along the upper surface of the strip whose opposite sides slope toward each other, and a plurality of grooves extending along the said upper surface between the first-mentioned grooves, said second-mentioned grooves having their opposed sides slope away from each other, said arrangement of the grooves forming a plurality of ribs on the said upper surface of the strip projecting at an angle which causes the ribs to be elastically collapsible along the shorter transverse axis of the strip.

GEORGE E. HENNING.

REFERENCES CITED

The following references are of record in the file of this patent:

UNITED STATES PATENTS

| Number | Name | Date |
| --- | --- | --- |
| 2,386,502 | Peik | Oct. 9, 1945 |
| 2,489,951 | Bump | Nov. 29, 1949 |

Certificate of Correction

Patent No. 2,571,715                                      October 16, 1951

GEORGE E. HENNING

It is hereby certified that error appears in the printed specification of the above numbered patent requiring correction as follows:

Column 5, line 32, for "form" read *forms*; column 6, line 38, for "electrically" read *elastically*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*